United States Patent [19]

Ansite et al.

[11] Patent Number: 4,522,639
[45] Date of Patent: Jun. 11, 1985

[54] UNIFIED FILTER AND CONNECTOR HOUSING ASSEMBLY INCORPORATING A DIVERSION VALVE

[75] Inventors: William K. Ansite, Glendale; James H. Ryder, Sierra Madre, both of Calif.

[73] Assignee: Figgie International Inc., Willoughby, Ohio

[21] Appl. No.: 485,179

[22] Filed: Apr. 15, 1983

[51] Int. Cl.³ .............................................. B01D 46/42
[52] U.S. Cl. ................................. 55/314; 128/205.12; 128/205.24; 128/201.25
[58] Field of Search .................. 128/201.23, 201.25, 128/201.26, 201.28, 202.26, 202.27, 204.26, 204.29, 205.12, 205.24, 205.28, 201.29, 203.11, 202.22; 55/DIG. 33, DIG. 35, 314; 137/597

[56] References Cited

U.S. PATENT DOCUMENTS

| | | | |
|---|---|---|---|
| 2,144,479 | 1/1939 | Bloomheart | 128/205.12 |
| 2,303,155 | 11/1942 | Berge | 128/142 |
| 4,011,865 | 3/1977 | Morishita | 128/142.3 |
| 4,352,353 | 10/1982 | Bolton et al. | 128/201.24 |

FOREIGN PATENT DOCUMENTS

| | | |
|---|---|---|
| 590096 | 7/1947 | United Kingdom . |
| 757652 | 9/1956 | United Kingdom . |
| 1317172 | 5/1973 | United Kingdom . |
| 1401613 | 7/1975 | United Kingdom . |
| 1588993 | 5/1981 | United Kingdom . |

OTHER PUBLICATIONS

Sierra, Chemical/Biological Protective Masks, Scott Aviation-Sierra Products, Inc.
Technical Manual, "Filter Assembly, Chemical-Biological Oxygen Mask Type CRU-80/P", Sierra Engineering Co., 15 Sep. 1977.

Primary Examiner—Henry J. Recla
Attorney, Agent, or Firm—Christel, Bean & Linihan

[57] ABSTRACT

A unified filter and connector housing (24) incorporating a diversion valve assembly (74), the housing assembly being usable with a protective breathing mask assembly (12) of the type requiring separate breathing gas and ventilating gas supply lines (18 and 20). The housing assembly includes first and second housing members (26, 32) which receive therebetween a filter (30) in an airtight relationship. The first housing member is provided with inlets (46, 62) to which quick disconnect supply lines (50, 66) for breathing gases and ventilating gases may be secured. Parallel breathing and ventilating gas passageways (42, 58) are disposed within the first housing member, only the breathing gas passageway normally being in a fluid communication with the filter. The diversion valve assembly (74) is operatively disposed between the breathing and ventilating gas passageways (46, 58) and when disposed in an emergency position opens the communication between the two passageways while substantially blocking the ventilating gas passageway downstream of said opening to cause most of the gas received from either inlet to flow through the filter and into the breathing gas supply line (18) and permitting only a small portion of the gas received from either inlet to pass through the ventilating gas supply line (20).

9 Claims, 5 Drawing Figures 4,522,639

UNIFIED FILTER AND CONNECTOR HOUSING ASSEMBLY INCORPORATING A DIVERSION VALVE

FIELD OF THE INVENTION

The present invention relates generally to air supply equipment for aircrewmen and more particularly to air supply equipment of the type which provides filtered breathing gas to a protective breathing mask of the type utilizing ventilating air for defogging, the supply equipment further including a unified filter and connector housing assembly which is securable to the apparel of an aircrewman, which housing assembly, incorporates a diversion valve which can insure the supply of both filtered breathing gas and ventilating gas to the aircrewman upon the failure of either the supply of the breathing gas or the supply of the ventilating gas.

BACKGROUND OF THE INVENTION

In high performance aircraft of the type utilized by Armed Forces it is customary to provide the aircrewmen with headgear of the type including a visor and a breathing mask. In order to improve the safety factor of the headgear it is desirable that provision be made for defogging the visor or lens, and also that the breathing gases supplied to the aircrewmen be filtered to prevent the inhalation of harmful gases. Such equipment could utilize a single source of gases for both purposes. Alternatively, breathing gases could be supplemented by a separate source of ventilating gases. One advantage of a system utilizing separate supplies of breathing gases and ventilating gases is that if one supply should fail there is an alternate backup supply which could be utilized for both purposes.

In prior art systems which filter the breathing gas the filter has been customarily mounted on the chest of the aircrewman, the filter housing assembly being secured in some manner to the aircrewman's apparel, such as the parachute harness. A quick disconnect breathing gas supply coupling is secured to the filter housing and if the aircrewman ejects from the aircraft there will be no loose air supply hoses which could flail the aircrewman during bailout. However, separate ventilating hoses, which in the past have not been connected to the filter housing, could flail the aircrewman during bailout.

OBJECTS AND SUMMARY OF THE INVENTION

It is an object of the present invention to overcome the shortcomings of known prior art supply systems for aircrewmen.

More specifically, it is an object of the present invention to provide a supply system for an aircrewman having protective head gear including a breathing mask and visor, which headgear requires both a supply of breathing gas and of ventilating gases, the supply system including a diversion valve which may insure that the aircrewman receives both ventilating gases and breathing gases in the event that the supply of one of said gases should fail.

It is another object of the present invention to provide a filter canister housing assembly mounted on the apparel of an aircrewman, the filter canister housing assembly being interconnected on its downstream side with an aircrewman's protective headgear by separate breathing and ventilating air lines, and being interconnected on its upstream side with a supply of breathing and ventilating gases by separate quick disconnect supply lines, which assembly will insure that if the aircrewman should eject during flight he will not be flailed by loose hoses after ejection.

The above objects and other objects and advantages of the present invention are accomplished by providing a filter canister housing assembly formed of first and second housing members securable to the apparel of an aircrewman and capable of receiving therebetween a filter canister in an airtight manner. One of said housing members is provided with inlet and outlet breathing gas connector ports and passageways and is so designed that breathing gases will flow from the inlet to the outlet breathing gas connector ports through the breathing gas passageways and through the filter canister. This housing member is further provided with inlet and outlet ventilating air connector ports and passageways and is so designed that ventilating gases will flow from the inlet to the outlet ventilating gas connector ports through the ventilating gas passageways, but not through the filter canister. The assembly is adapted to be connected to quick disconnect supply lines for both the breathing gases and the ventilating gases. Further gas lines extend from the assembly to the aircrewman's protective headgear. Mounted within the assembly is a diversion valve which is capable of insuring that under normal operation the breathing gases and the ventilating gases operate independently of each other, but which can be moved to one of two emergency positions to insure that either the ventilating gases may be used for both ventilating and breathing purposes or, alternatively, that breathing gases may be used for both breathing and ventilating purposes.

The above objects and advantages of this invention as well as others will become more apparent from the following detailed description taken in conjunction with the accompanying drawings in which a preferred form of this invention is illustrated.

DETAILED DESCRIPTION OF A PREFERRED EMBODIMENT

Figure 1:
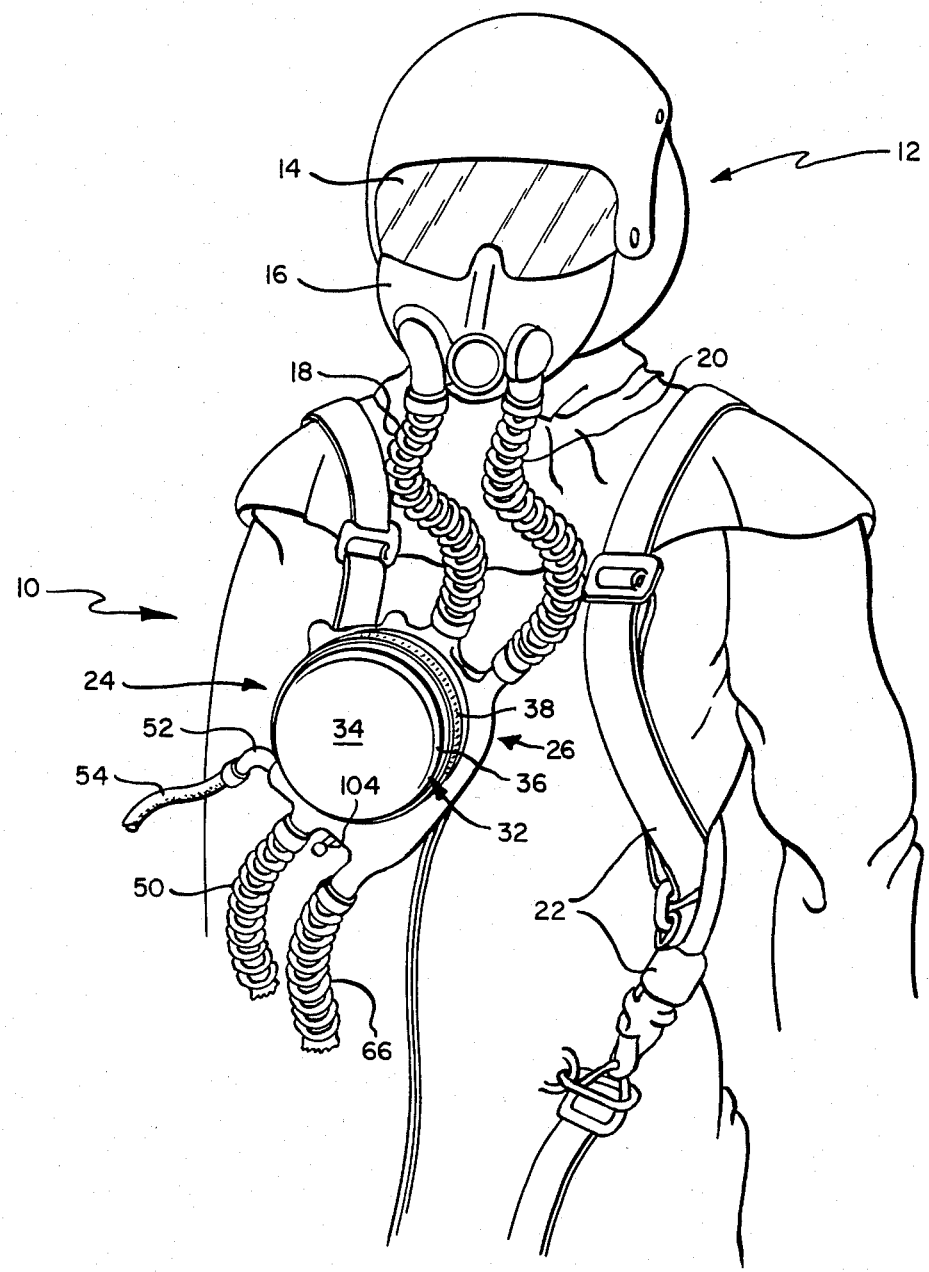
FIG. 1 is a view of an aircrewman wearing the unified filter and connector housing assembly of this invention, which housing assembly incorporates a diversion valve.

Referring first to FIG. 1 an aircrewman is indicated generally at 10 which aircrewman is provided with a protective headgear or breathing mask assembly indicated generally at 12. The headgear includes a visor or lens 14 and a breathing mask such as a full face mask 16 or an oral/nasal mask. The headgear is also provided with suitable connections to a breathing air line 18 and a ventilating air line 20. As is customary the aircrewman is also provided with a parachute held in place by parachute harness straps 22. A unified filter and connector housing assembly, indicated generally at 24, is secured to one of the parachute harness straps 22.

Figure 2:
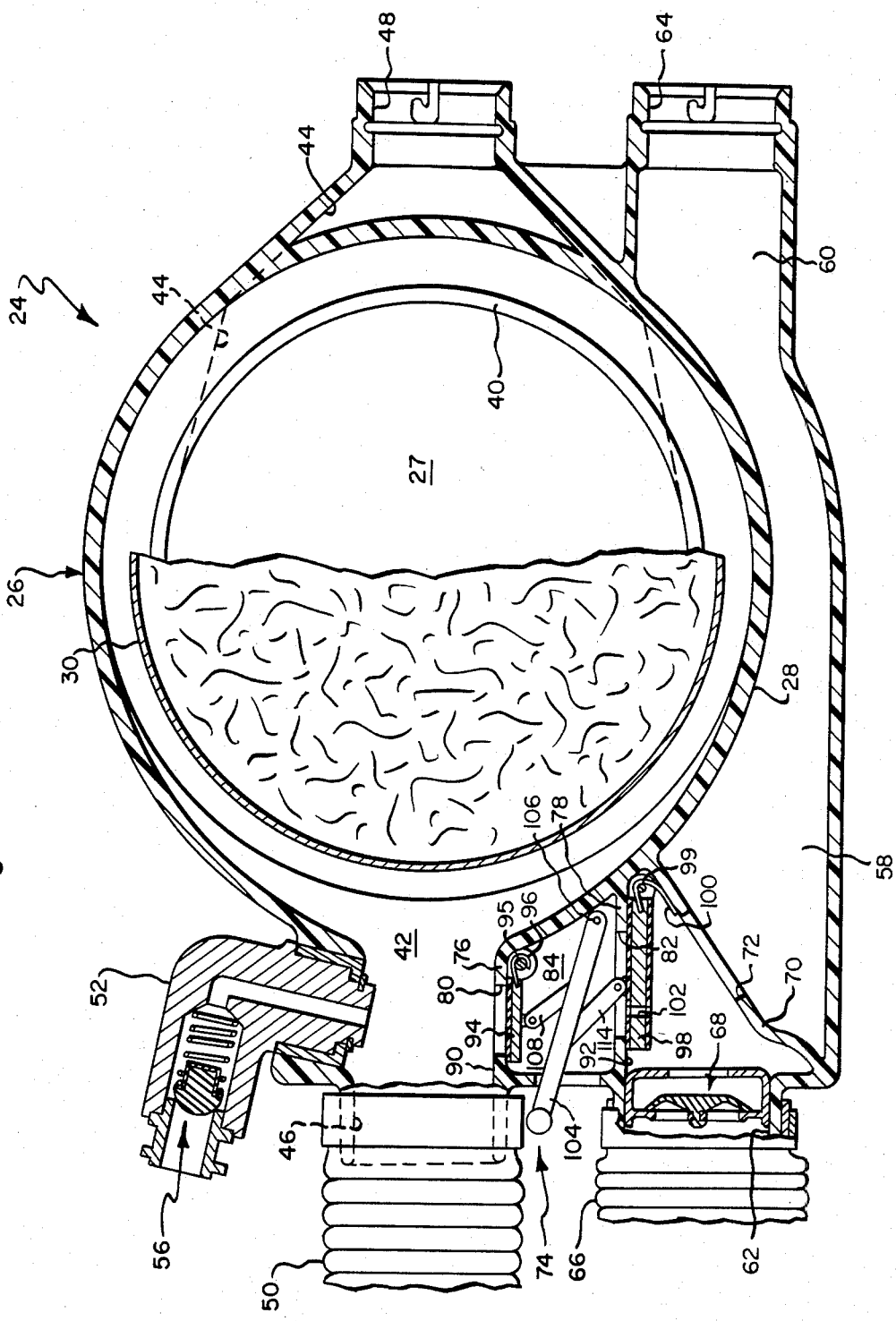
FIG. 2 is an enlarged sectional view of the housing assembly shown in FIG. 1.

The housing assembly 24 includes first and second housing members. The first housing member, indicated generally at 26, is disposed adjacent the body of the aircrewman and includes an end wall 27 adjacent the aircrewman and a cylindrical portion 28 which may receive a filter canister shown in part at 30. The second housing member, indicated generally at 32, includes an end wall 34 and a cylindrical portion 36 which may be clamped about the cylindrical portion 28 by means of a clamp 38 which is generally in the form of a hose clamp. As illustrated in these drawings and particularly in FIG. 2 the filter canister 30 is a cylindrical member, which cylindrical member is adapted to be held in airtight relationship against seal 40 which is spaced away from end wall 27. The first housing member is further provided with a breathing gas inlet passageway 42 and a breathing gas outlet passageway 44. The inlet passageway 42 extends away from an inlet port indicated at 46, and the breathing gas outlet passageway 44 terminates in an outlet port 48. A quick disconnect breathing gas supply line 50 is connected to the inlet port 46, which quick disconnect supply line is provided with a check valve (not shown). The breathing gas inlet passageway 42 is also operatively interconnected to a fitting 52 which in turn may be secured to an oxygen bottle by line 54, which oxygen bottle (not shown) is carried by the aircrewman. The fitting is provided with a check valve indicated generally at 56.

The breathing gas may be either oxygen or a mixture of oxygen and air and it is normally supplied under pressure to either inlet port 46 or to fitting 52. The breathing gas will normally flow through passageway 42 and about the filter canister 30 to an inlet which is spaced away from the aircrewman. The flow of breathing gas will then be through the filter towards the aircrewman, and thence outwardly through the space between wall 27 and the filter 30, as afforded by the raised seal 40, and through the outlet passageway 44 to outlet port 48. As can be seen from FIG. 1 the outlet port 48 is in turn connected to the breathing air line 18.

The first housing member 26 is further provided with conduit means for ventilating air. To this end, as can best be seen from FIG. 2, ventilating air conduit has a ventilating air inlet passageway 58 and a ventilating air outlet passageway 60. The ventilating air inlet passageway 58 extends away from an inlet port 62 and the outlet passageway 60 terminates with an outlet port 64. The inlet port 62 is in turn interconnected with a quick disconnect ventilating air supply line 66 of well known construction. A check valve indicated generally at 68 is disposed within the inlet port 62. The outlet port 66 is in turn connected to the ventilating air line 20 as indicated in FIG. 1. As can be seen under normal operation ventilating air will flow from line 66 through inlet port 62, inlet and outlet passageways 58, 60, and outlet port 64.

The ventilating air inlet passageway 58 is provided with a barrier wall 70 which in turn is provided with a port or aperture 72. The purpose of this structure will be described below.

As previously indicated the supply lines 50 and 66 are of a quick disconnect type which are well known in the prior art. In practice to insure that the normal breathing gas supply line is connected to the proper port and also to insure that the normal ventilating air supply line is connected to the proper port, quick disconnects of the male and female type are employed for the respective ports.

To insure that the aircrewman receives both breathing gases and ventilating gases even if one or the other supply should fail, a diversion valve assembly, indicated generally at 74, is provided. To this end the diversion valve assembly includes first and second spaced apart walls 76, 78, the first spaced apart wall 76 being provided with a first valve port 80 and the second spaced apart wall 78 being provided with a second valve port 82. A passageway 84 extends from one side 86 (FIG. 4) of the first valve port to one side 88 (FIG. 3) of the second valve port. As can be seen from an inspection of the various figures the breathing gas passageway 42 is in communication with the other side 90 of the first valve port 80 and the ventilating gas passageway 58 is similarly in communication with the other side 92 of the second valve port 82. First and second closure structures or flapper valves are associated with the first and second valve ports 80 and 82. To this end a first closure structure or flapper valve 94 is hinged at 95 adjacent the one side 86 of the first valve port 80 and is normally spring biased to a closed position by a spring 96. Similarly, a second closure structure or flapper valve 98 is hinged at 99 adjacent the other side 92 of the second valve port 82 and is normally spring biased to a closed position by spring 100. The second closure structure is provided with a small aperture or orifice 102.

Figure 3:
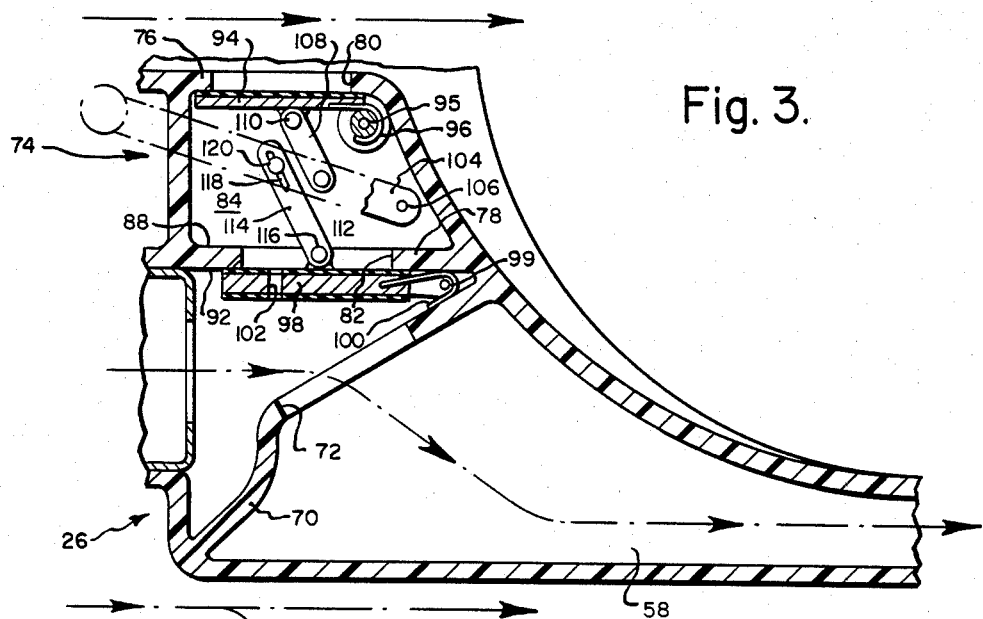
FIG. 3 is a still further enlarged section view of a portion of the housing assembly shown in FIG. 2 and illustrating the diversion valve in its first or normal position of operation.
Figure 4:
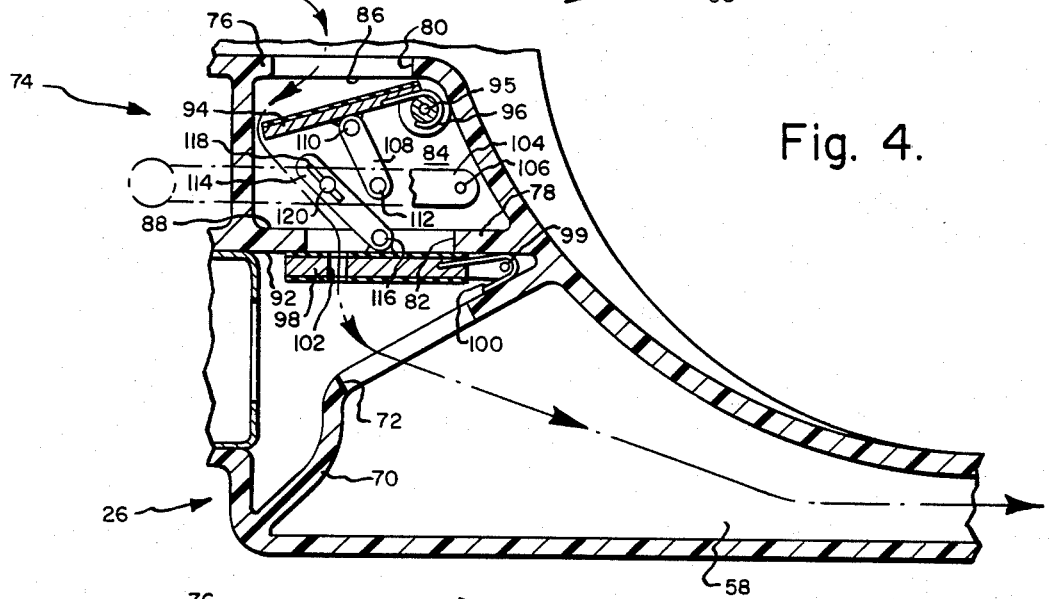
FIGS. 4 and 5 are views similar to FIG. 3 but showing the diversion valve in its second and third position of operation, respectively.

Operating means is provided for moving the valves 94 and 98 sequentially away from their normal operating positions wherein they are in engagement with the ports to alternate operative positions. To this end an operating lever 104 is provided, which operating lever is pivoted at 106 within the passageway 84. The end of the lever 104 remote from the pivot extends outside of the first housing member 26 as can best be seen in FIG. 1. When the lever is in its normal or first position, as illustrated in FIG. 3, the closure members 94 and 98 will be disposed against the adjacent valve seats 86, 92 about ports 80 and 82, respectively. The operating lever 104 can be moved to a first emergency or second position as shown in FIG. 4. When this happens the first closure member is moved away from the port 80 by means of a link 108. The link 108 is pivotally secured at one end to the first closure member at pivot 110, and is pivotally secured at its other end to the operating lever 104 at pivot 112. Another operating link 114 is provided, which operating link 114 is pivotally secured at 116 to the second closure structure 98. The other end of the link 114 is provided with a slot 118 which passes through a pin carried by element 120 which is secured to lever 104. When the lever 104 is moved from its normal or first position shown in FIG. 3 to its first emergency or second position shown in FIG. 4, the lower closure member 98 will not be caused to move as the pin carried by element 120 will move within the slot 118 and the closure will be held in its closed position by springs 100. Further downward movement of the operating lever 104 will cause the pin to bottom out at the end of the slot 118 closest to the pin 116 and will then cause the closure member 98 to move away from the other wall 92 until it assumes the second emergency or third position shown in FIG. 5 where the second closure structure 98 contacts the barrier wall 70.

While it is believed that the operation of this device should be apparent from the foregoing description it will be summarized briefly below.

In normal flight operation both breathing gases and ventilating gases will be provided to the head gear 12 through lines 18 and 20 which are in turn operatively interconnected with lines 50 and 64 through housing assembly 24. It is presumed also that line 54 is connected to fitting 52 and the other end of line 54 is connected to a bottle of oxygen, the valve on the oxygen bottle normally being closed. In this condition breathing gas will flow through line 50, the passageway 42, filter 30, passageway 44, and then to the breathing mask 16 through line 18. Similarly ventilating air will pass from line 64, through the passageway 58-60, and thence to the helmet through line 20 where it is used for defogging the visor and also for cooling purposes. In this condition the ventilating air does not pass through the filter. In addition, the two supplies are entirely independent of each other. In the event that the ventilating air supply should fail the operating lever can be moved from the normal or first position shown in FIG. 3 to the second position shown in FIG. 4. When in this emergency position breathing gases will flow through port 80, past the closure 94, through the passageway 84, and thence through the orifice 102 in closure 98. Continued flow will be through passageway 58-60 and outlet 64 and into the ventilating line 20. It should be noted that most of the air from the breathing gas supply line will continue to flow through the filter 30 and only a small portion will pass through the orifice 102. Also, due to the check valve 68 there will be no back flow through the quick disconnect supply line 66. A check valve 56 also prevents back flow through line 54 in the event that it were disconnected from the oxygen bottle.

Figure 5:
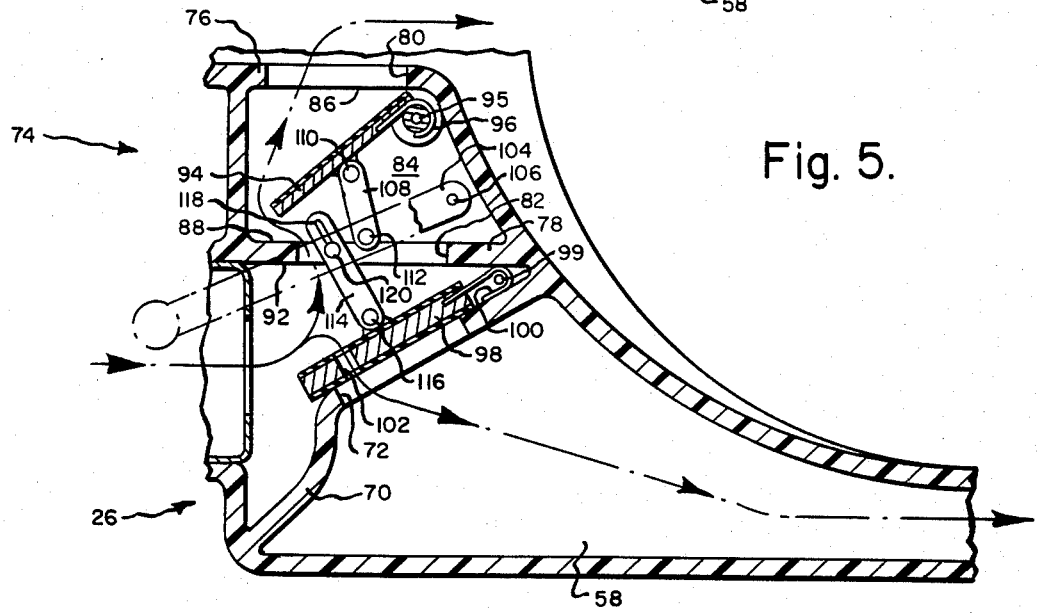

In the event that the breathing gas supply should fail the operating lever can then be moved to a third position illustrated in FIG. 5. As the ventilating air passageway 58 is substantially blocked by closure member 98 most of the air will be diverted through ports 80 and 82 and passageway 84 into the passageway 42 and thence through the filter 30 and outlet passageway 44 and on to the breathing air line 18. However, again a small portion of the air supply can pass through the orifice 102 in closure 98 to assist in defogging. The check valve (not shown) in the quick disconnect supply line 50 will prevent back flow through this line.

In the event that the pilot ejects both supply lines 50 and 64 will be disconnected and will be closed by their associated check valves and oxygen will be provided from the bottle through line 54. The aircrewman will then move the operating lever to one of the emergency positions to prevent fogging of the lens 14 if this were desired. As the housing 26 is secured to the clothing of the aircrewman and as there are no loose supply lines after ejection the aircrewman will not possibly be injured by flailing disconnected supply lines.

While a preferred structure in which the principle of the present invention have been incorporated is shown and described above, it is to be understood that this invention is not to be limited to the particular details shown and described above, but that, in fact, widely differing means may be employed in the practice of the broader aspects of this invention.

What is claimed is:

1. A unified filter and connector housing assembly for use with a protective breathing mask assembly of the type utilizing ventilating air for defogging, said filter and connector housing assembly comprising:

first and second housing members secured to each other and capable of receiving a filter canister therebetween in an airtight manner, the first housing member being provided with inlet and outlet breathing gas connector port means and passageway means and so designed that in normal operation breathing gases will flow from a breathing gas supply through the inlet breathing gas connector port means and to the outlet breathing gas connector port means through said breathing gas passageway means and through said filter canister, and said first housing member further being provided with inlet and outlet ventilating gas connector port means and passageway means and so designed that in normal operation ventilating gases will flow from a ventilating gas supply through the inlet ventilating gas connector port means and to the outlet ventilating gas connector port means through said ventilating gas passageway means and not through said filter canister, said first housing member further being characterized by the provision of diversion valve means movable from normal to emergency positions and capable upon the failure of either the breathing gas supply or the ventilating gas supply and when placed in an emergency position of insuring that most of the gas received at one of said inlets passes through the breathing gas passageway means and the filter canister while diverting a small portion of the gas available to the ventilating gas passageway means.

2. The unified filter and connector housing assembly as set forth in claim 1 wherein said diversion valve means includes first and second valves movable between a normal position wherein the flow of gases between the breathing gas and ventilating gas passageway means is blocked to an emergency position where the flow of gases between the breathing gas and ventilating gas passageways is not blocked.

3. The unified filter and connector housing assembly as set forth in claim 2 wherein one of said valve means is provided with an orifice and when disposed in an emergency position substantially blocks the flow of air through the ventilating gas passageway means except that portion which passes through said orifice.

4. A unified filter and connector housing assembly for use with a protective breathing mask assembly of the type utilizing ventilating air for defogging, said filter and connector housing assembly comprising:

first and second housing members secured to each other and capable of receiving a filter canister therebetween in an airtight manner, the first housing member being provided with inlet and outlet breathing gas connector port means and passageway means and so designed that in normal operation breathing gases will flow from a breathing gas supply through the inlet breathing gas connector port means and to the outlet breathing gas connector port means through said breathing gas passageway means and through said filter canister, and said first housing member further being provided with inlet and outlet ventilating gas connector port means and passageway means and so designed that in normal operation ventilating gases will flow from a ventilating gas supply through the inlet ventilating gas connector port means and to the outlet ventilating gas connector port means through said ventilating gas passageway means and not through said filter canister, the breathing gas and ventilating gas passageway means being parallel to each other; said assembly being further characterized by the provision of a diversion valve assembly operatively disposed between said passageway means and upstream of said filter canister and when in an emergency position being capable of causing gases from either the breathing gas inlet or ventilating gas inlet port means to be split with a substantial portion passing through the filter canister and a smaller portion passing through the ventilating gas outlet port means.

5. A unified filter and connector housing assembly incorporating a diversion valve for use with a protective breathing mask assembly of the type utilizing ventilating air for defogging, said assembly comprising:

first and second housing members secured to each other and capable of receiving a filter canister therebetween in an airtight manner, one of said housing members being provided with a breathing gas inlet means and passageway means and a ventilating gas inlet means and passageway means so designed that gases flowing through the breathing gas passageway means will pass through said filter canister and gases passing through said ventilating gas passageway means will not pass through said filter canister in normal operation, a communicating passageway extending between said breathing gas passageway means and said ventilating gas passageway means, and diversion valve means cooperable with said passageway means and capable when in a normal position of blocking the flow of gas between the breathing gas and ventilating gas passageway means and capable when in an emergency position of permitting the flow of a small amount of gas from one of either the breathing gas inlet means or the ventilating gas inlet means through the ventilating gas passageway while at the same time permitting the flow of a major portion of the gas from said one inlet means through the breathing gas passageway means.

6. A unified filter and connector housing assembly as set forth in claim 6 wherein said diversion valve means includes blocking means for substantially blocking the ventilating gas passageway means when said valve means is disposed in its emergency position.

7. The unified filter and connector housing assembly as set forth in claim 6 wherein said blocking means is flapper valve movable to a closed position when in said emergency position, said flapper valve being provided with a bleed orifice.

8. The unified filter and connector housing assembly as set forth in claim 5 wherein said diversion valve means includes a valve port disposed between the breathing gas and ventilating gas passageway means, and first and second valves, the first valve being capable of closing said port when the diversion valve means is in its normal operating position, and said second valve being capable of substantially blocking said ventilating gas passageway means when the diversion valve means is in its emergency position.

9. The unified filter and connector housing assembly as set forth in claim 8 wherein said ventilating gas passageway means is provided with a valve port, said second valve being seated upon said second valve port when the diversion valve is in its emergency position, said second valve being provided with a bleed orifice.

* * * * *

UNITED STATES PATENT AND TRADEMARK OFFICE
CERTIFICATE OF CORRECTION

PATENT NO.  : 4,522,639
DATED       : June 11, 1985
INVENTOR(S) : William K. Ansite and James H. Ryder It is certified that error appears in the above-identified patent and that said Letters Patent are hereby corrected as shown below:

Claim 6, column 8, line 7, "6" should be --5--.

Signed and Sealed this

Fifteenth Day of October 1985

[SEAL]

Attest:

DONALD J. QUIGG

Attesting Officer

Commissioner of Patents and
Trademarks—Designate